M. B. HASSLER.
Churn Dasher.

No. 25,410

Patented Sept. 13, 1859.

Witnesses:
J. P. Keeper
List

Inventor:
Malachi B Hassler

UNITED STATES PATENT OFFICE.

MALACHI B. HASSLER, OF COLUMBIA CITY, INDIANA.

CHURN.

Specification of Letters Patent No. 25,410, dated September 13, 1859.

*To all whom it may concern:*

Be it known that I, M. B. HASSLER, of Columbia City, in the county of Whitley and State of Indiana, have invented a new and useful Improvement in Churns; and I do hereby declare that the following is a full and clear description thereof, reference being had to the accompanying drawings, and to the letters of reference marked thereon, and made to form a part of this specification.

My invention relates to certain improvements in the dashers of churns by means of which I am enabled to gather the butter by a reversed motion of the dasher as hereinafter set forth and described.

Figure 1:
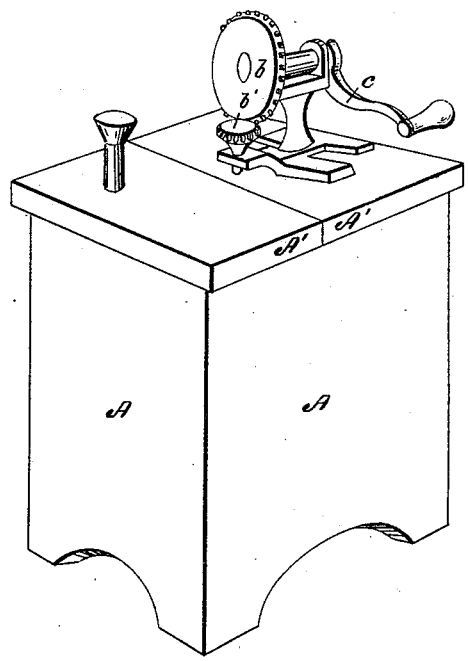
Figure 2:
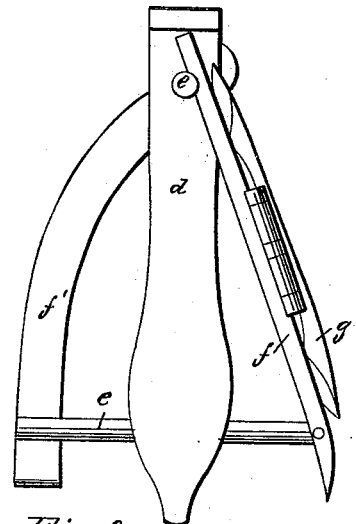
Figure 3:
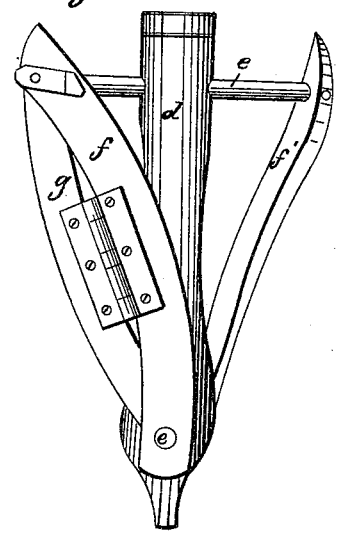
Figure 4:
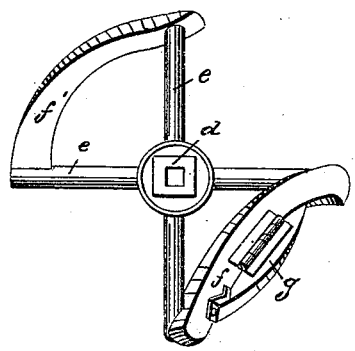

In reference to the accompanying drawings Figure 1, is a perspective view of the churn as arranged for use, Fig. 2, is an elevation of the dasher, showing its adjustment for churning, Fig. 3, is an elevation of the dasher showing its adjustment for gathering the butter, Fig. 4 is a top view of the dasher.

(A) represents the shell of the churn, provided with a cover or lid (A') upon which are arranged pinion wheels (b b') and crank (c) by means of which the dasher may be operated. Attached to the pinion wheel (b') is a shaft which extends through the lid (A') into a socket in the dasher shaft (d) so that said lid (A') may be taken from the churn without removing the dasher. The dasher shaft (d) is formed quite small at its lower end, as shown clearly in Figs. 2 and 3, and is adjusted to a step at the bottom of the shell (A), and is provided with two arms (e, e) passing through it at right angles, to which are attached two curved wings (f, f'), the convex side of the wing (f') is adjusted outwardly, so as to come in contact with the cream near the shell of the churn, while the wing (f) is arranged with its convex side inward so as to oppose the current of cream near the shaft (d), by means of which arrangement, the concussive action of the wings (f, f') is brought to bear upon all the particles of cream, thereby conducing to the rapidity of churning; hinged to the wing (f) is a folding curved leaf (g), so arranged that it may be folded back upon the wing (f), during the process of churning, and when it may be desired to gather the butter; by reversing the motion of the dasher, the said leaf (g) may be opened as shown clearly in Fig. 3, and serve to gather the butter near the shell of the churn, while the wing (f) serves to secure it next to the shaft (d), so that, after the operation of churning is complete, the butter may be gathered from the butter-milk as before described.

Having described the construction and operation of my invention, what I claim and desire to secure by Letters Patent is—

The arrangement of the hinged curved leaf (g) in combination with the wings (f, f',), constructed and arranged to operate substantially as described for the purposes set forth.

In testimony of which invention I have hereunto set my hand in presence of witnesses.

MALACHI B. HASSLER.

Witnesses:
J. W. KEEFER,
P. DICK.